US011840885B2

United States Patent
Darlot et al.

(10) Patent No.: US 11,840,885 B2
(45) Date of Patent: Dec. 12, 2023

(54) METHOD FOR DETECTING AN OBSTACLE, ELECTROMECHANICAL ACTUATOR AND CLOSURE OR SOLAR PROTECTION UNIT

(71) Applicant: SOMFY ACTIVITES SA, Cluses (FR)

(72) Inventors: Arnaud Darlot, Cluses (FR); Eric Lagarde, Cluses (FR); Frédéric Maraval, Cluses (FR); Héléna Robert, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 17/913,105

(22) PCT Filed: Mar. 19, 2021

(86) PCT No.: PCT/EP2021/057120
§ 371 (c)(1),
(2) Date: Sep. 20, 2022

(87) PCT Pub. No.: WO2021/186051
PCT Pub. Date: Sep. 23, 2021

(65) Prior Publication Data
US 2023/0123246 A1  Apr. 20, 2023

(30) Foreign Application Priority Data

Mar. 20, 2020 (FR) .................................. 2002756

(51) Int. Cl.
*E06B 9/72* (2006.01)
*H02P 23/00* (2016.01)
(Continued)

(52) U.S. Cl.
CPC ............ *E06B 9/72* (2013.01); *H02P 23/0031* (2013.01); *H02P 23/14* (2013.01); *E06B 2009/6836* (2013.01); *H02P 2207/05* (2013.01)

(58) Field of Classification Search
CPC ...... E06B 9/72; E06B 9/68; E06B 2009/6836; E06B 2009/6818; H02P 23/0031; H02P 23/14; H02P 2207/05
See application file for complete search history.

(56) References Cited

U.S. PATENT DOCUMENTS 4,055,789 A * 10/1977 Lasater ..................... H02J 7/14
320/155
4,567,416 A * 1/1986 Brunier-Coulin .... G05B 19/425
318/592
(Continued)

FOREIGN PATENT DOCUMENTS

| CN | 1748957 A | 3/2006 |
| CN | 101611209 A | 12/2009 |

(Continued)

OTHER PUBLICATIONS

International Search Report dated Jun. 14, 2021, for PCT/EP2021/057120, 5 pages.

(Continued)

*Primary Examiner* — Abe Massad
(74) *Attorney, Agent, or Firm* — NIXON & VANDERHYE

(57) ABSTRACT

A method for detecting an obstacle opposing the movement of a screen in a home automation closure or sun protection system includes an electromechanical actuator driving movement of the screen. The electromechanical actuator includes a torque support, a housing, an output shaft, and an electric motor including a stator and a rotor. The system includes a winding shaft rotating the screen and a connecting accessory between the electromechanical actuator's output shaft and the winding shaft. The method includes: determining an angular displacement value of the rotor with respect to the stator; determining angular displacement of the winding shaft relative to the housing or torque support of (Continued)

the electromechanical actuator; determining angular deformation of the kinematic chain between the electric motor and the winding shaft by comparing these two angular displacements; and determining the presence of an obstacle to screen movement from an angular deformation exceeding a predefined value.

19 Claims, 15 Drawing Sheets

(51) Int. Cl.
*H02P 23/14* (2006.01)
*E06B 9/68* (2006.01)

(56) References Cited

U.S. PATENT DOCUMENTS

| | | | | |
|---|---|---|---|---|
| 4,665,965 | A * | 5/1987 | Pasquier | E06B 9/34 160/310 |
| 5,760,558 | A * | 6/1998 | Popat | E06B 9/32 160/188 |
| 6,111,376 | A * | 8/2000 | Jean-Marc | E06B 9/68 318/432 |
| 6,392,374 | B1 * | 5/2002 | Menetrier | H01H 35/006 318/446 |
| 6,465,980 | B1 * | 10/2002 | Orsat | E06B 9/82 318/434 |
| 6,936,987 | B2 * | 8/2005 | Cheron | E06B 9/82 318/369 |
| 7,515,338 | B2 * | 4/2009 | Canon | E06B 9/80 160/310 |
| 8,004,224 | B2 * | 8/2011 | Marchetto | E06B 9/88 318/434 |
| 8,008,883 | B2 * | 8/2011 | Hoff | G05B 19/425 700/275 |
| 8,253,288 | B2 * | 8/2012 | Lagarde | F16D 49/04 310/77 |
| 8,853,973 | B2 * | 10/2014 | Lagarde | E06B 9/68 160/310 |
| 9,080,382 | B2 * | 7/2015 | Lagarde | E06B 9/68 |
| 9,115,538 | B2 * | 8/2015 | Andreasen | H02K 11/21 |
| 9,599,996 | B2 * | 3/2017 | Lagarde | E05F 15/70 |
| 9,665,084 | B2 * | 5/2017 | Lagarde | E06B 9/68 |
| 10,648,232 | B2 * | 5/2020 | Colson | E06B 9/82 |
| 11,035,172 | B2 * | 6/2021 | Rieper | E06B 9/322 |
| 11,264,933 | B2 * | 3/2022 | Zhang | H02P 6/185 |
| 11,486,193 | B2 * | 11/2022 | Chiang Huang | E06B 9/322 |
| 2005/0039865 | A1 * | 2/2005 | Bruno | E06B 9/80 160/310 |
| 2005/0206334 | A1 * | 9/2005 | Cavarec | E06B 9/68 318/139 |
| 2008/0257504 | A1 * | 10/2008 | Marchetto | E06B 9/88 160/311 |
| 2012/0137585 | A1 * | 6/2012 | Brown | E06B 9/86 49/31 |
| 2016/0373036 | A1 * | 12/2016 | Bruno | H02P 27/08 |
| 2020/0195180 | A1 * | 6/2020 | Li | H02P 21/06 |
| 2021/0285286 | A1 * | 9/2021 | Schuehmacher | F16F 15/124 |
| 2021/0396076 | A1 * | 12/2021 | Lagarde | E06B 9/70 |

FOREIGN PATENT DOCUMENTS

| | | |
|---|---|---|
| CN | 101806921 A | 8/2010 |
| CN | 103883244 A | 6/2014 |
| CN | 104727726 A | 6/2015 |
| CN | 105264161 A | 1/2016 |
| CN | 106661916 A | 5/2017 |
| CN | 107002462 A | 8/2017 |
| DE | 197 06 209 A1 | 5/1998 |
| DE | 10 2019 110 142 A1 | 10/2020 |
| EP | 1 727 959 | 12/2006 |
| EP | 1 945 901 | 7/2008 |
| EP | 2 063 065 A2 | 5/2009 |
| EP | 2 256 284 | 12/2010 |
| EP | 2 538 015 A1 | 12/2012 |
| EP | 2 713 076 A1 | 4/2014 |
| FR | 2 928 401 A1 | 9/2009 |
| IT | VE20070089 A1 | 5/2009 |
| TW | 448979 U | 8/2001 |
| WO | 2005/090736 | 9/2005 |
| WO | 2007/051865 | 5/2007 |
| WO | 2014/207387 | 12/2014 |

OTHER PUBLICATIONS

Written Opinion of the ISA dated Jun. 14, 2021, for PCT/EP2021/057120, 6 pages.
Search Report for FR 2002756 dated Nov. 24, 2020, 2 pages.

* cited by examiner

METHOD FOR DETECTING AN OBSTACLE, ELECTROMECHANICAL ACTUATOR AND CLOSURE OR SOLAR PROTECTION UNIT

This application is the U.S. national phase of International Application No. PCT/EP2021/057120 filed Mar. 19, 2021 which designated the U.S. and claims priority to FR 2002756 filed Mar. 20, 2020, the entire contents of each of which are hereby incorporated by reference.

BACKGROUND OF THE INVENTION

Field of the Invention

The present invention relates to an obstacle detection method, implemented by an electromechanical actuator in a home automation closure or sun protection system. The present invention also relates to an electromechanical actuator in a home automation closure or sun protection system, adapted to implement this obstacle detection method.

Description of the Related Art

Generally speaking, the present invention relates to the field of closure or sun protection systems, in which it is known to use an electromechanical actuator so as to automate the closing and opening of a closure screen, such as a roller shutter, or a sun protection screen, such as a blind, in particular so as to set a screen in motion between at least a first position and a second position.

A known motorised drive device comprises an electromechanical actuator for driving a movable closing, blackout, or sun protection element, such as a shutter, a door, a grille, a blind, or any other equivalent equipment, hereinafter referred to as a screen. In particular, such an electromechanical actuator is placed inside a winding tube and rotates the winding tube on which the screen is wound.

The invention is applicable to any electromechanical actuator comprising an electric motor, whether DC or AC, synchronous or asynchronous. The invention is particularly-well suited to electromechanical actuators comprising an electronically commutated brushless electric motor or, more generally, a "permanent magnet synchronous" electric motor.

The invention can be used in the field of home and/or building automation, for example for residential, commercial or industrial buildings.

EP2256284A teaches the use of two Hall effect sensors to detect the angular position of a magnet in a blind's drive. This does not detect an obstacle in the path of the blind.

EP1945901A1 describes an electromechanical actuator for driving a roller shutter, comprising a mechanical clearance device arranged between an actuator body and an actuator head, itself intended to support the electromechanical actuator in a fixed manner on a portion of a building. A sensor device is used to determine an angular variation between the body and the head of the actuator, relative to a stressed initial position, this initial position being linked to the weight of the shutter. For example, when the shutter is lowered and hits an obstacle, the weight stress of the shutter is reduced. The driving motion provided by the actuator then tends to take up the angular clearance. The corresponding angular variation is seen by the sensor device. The electromechanical actuator interprets exceeding an angular variation threshold as the presence of an obstacle. In principle, the motorised drive is stopped or the movement reversed to relieve the stress on the obstacle.

Other solutions for obstacle detection are also known, for example based on speed or motor current analysis, but these remain imprecise and extremely dependent on the characteristics of the motor and the driven load.

In all cases, the detection of the impact of the obstacle passes through a large kinematic chain which makes it complicated to determine the right threshold for obstacle detection.

SUMMARY OF THE INVENTION

It is these disadvantages that the invention more particularly intends to remedy by proposing an obstacle detection method which at least partially overcomes the impact of clearance in the kinematic chain, the weight of the screen, the accuracy of the sensors or the determination of thresholds.

In this respect, the present invention relates, according to a first aspect, to a method for detecting an obstacle opposing the movement of a screen in a home automation closure or sun protection system comprising an electromechanical actuator for driving the movement of the screen, the electromechanical actuator comprising a torque support, a housing, an output shaft, an electric motor comprising a stator and a rotor, the system comprising a winding shaft rotating the screen and a connecting accessory between the output shaft of the electromechanical actuator and the winding shaft, the method comprising the following steps:
- determining an angular displacement value of the rotor with respect to the stator of the electromechanical actuator,
- determining an angular displacement value of the winding shaft relative to the housing or torque support of the electromechanical actuator,
- determining an angular deformation of the kinematic chain between the electric motor and the winding shaft by comparing these two angular displacement values,
- determining the presence of an obstacle to the movement of the screen from an angular deformation greater than a predefined angular deformation value.

This ensures obstacle detection without having to add unnecessary weight to the screen. The combination of two lower-resolution sensors allows the presence of an obstacle to be quickly and efficiently determined.

According to an advantageous feature of the invention, the method comprises a step of converting (a) the angular displacement value of the rotor into equivalent angular displacement data of the winding shaft or (b) the angular displacement value of the winding shaft with respect to the housing or torque support of the electromechanical actuator into equivalent angular displacement data of the rotor.

This step converts one of the two values into an equivalent value comparable to the other.

According to an advantageous feature of the invention, the equivalent angular displacement data is obtained by dividing the angular displacement value of the rotor by the theoretical reduction ratio of a gearbox of the electromechanical actuator, the reduction ratio being a number greater than 1, or conversely by multiplying the angular displacement value of the winding shaft by the theoretical reduction ratio of the gearbox of the electromechanical actuator.

Advantageously, the method comprises a step of processing and filtering a comparison signal obtained from the angular displacement signal of the rotor and the angular displacement signal of the winding shaft.

According to an advantageous feature of the invention, the method comprises a step of learning the predefined angular deformation value as a function of angular deformation deviation data and/or triggering times of these deviations measured during a learning cycle.

According to another advantageous feature of the invention, the reaching of extreme positions by the screen is managed by comparing the angular displacement value of the winding shaft with a predefined displacement value.

The present invention relates, according to a second aspect, to an electromechanical actuator comprising a torque support, a housing, an electric motor comprising a stator and a rotor, and an output shaft, rotatably engaged with a winding shaft through a connecting accessory, the electromechanical actuator being characterised in that it further comprises a first position detection device, adapted to define an angular position of the rotor and a second position detection device, adapted to define an angular position of the winding shaft in rotational engagement with the output shaft, and an electronic control unit adapted to process the data from the two position detection devices so as to implement the above-mentioned method.

According to an advantageous feature of the invention, the winding shaft is a winding tube in which the electromechanical actuator is at least partially inserted, the latter comprising a bearing ring rotating around the housing with respect to the torque support and in rotational engagement with the winding tube, the second position detection device being adapted to determine the rotation of the bearing ring with respect to the torque support of the electromechanical actuator.

According to another advantageous feature of the invention, the bearing ring comprises at least two magnetic sectors evenly distributed over a circumference or a surface opposite a magnetic sensor device arranged in the housing of the electromagnetic actuator.

Advantageously, the electromechanical actuator comprises a deformation element placed on the kinematic chain between the rotor and the winding shaft, comprising an upstream part and a downstream part, rotatable with respect to each other and comprising a resilient device opposing the rotational movement of the upstream and downstream parts.

This resilient device may comprise a torsion bar.

In such a case, it can be foreseen that the resilient device comprises a central rod and two pinions attached to the ends of the central rod and engaging with internal teeth of the upstream and downstream parts.

Preferably, the electromechanical actuator comprises an electronically-switched permanent magnet synchronous electric motor.

According to an advantageous feature of the invention, only the second detection device of the two angular position detection devices comprises physical sensors, in particular magnetic sensors, for determining angular position.

In a third aspect, the present invention relates to a closure or sun protection system comprising a screen, a winding shaft and an electromechanical actuator rotatably engaged with the winding shaft, the electromechanical actuator being as mentioned above.

BRIEF DESCRIPTION OF THE DRAWINGS

The invention will be better understood and advantages beyond these will emerge more clearly in light of the following description of an embodiment of an obstacle detection method, three embodiments of an electromechanical actuator configured to implement the obstacle detection method, and a closure or sun protection system comprising such an actuator, given solely by way of example and made with reference to the accompanying drawings, in which.

DESCRIPTION OF THE PREFERRED EMBODIMENTS

Figure 1:
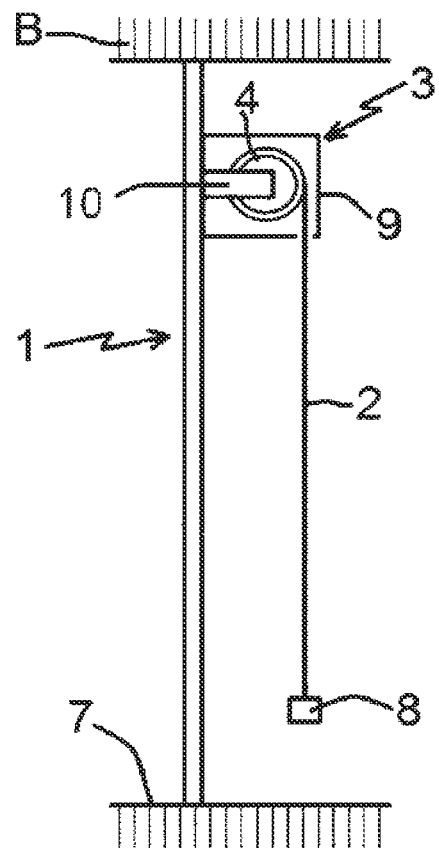
FIG. 1 is a schematic cross-section of a system according to one embodiment of the invention.
Figure 2:
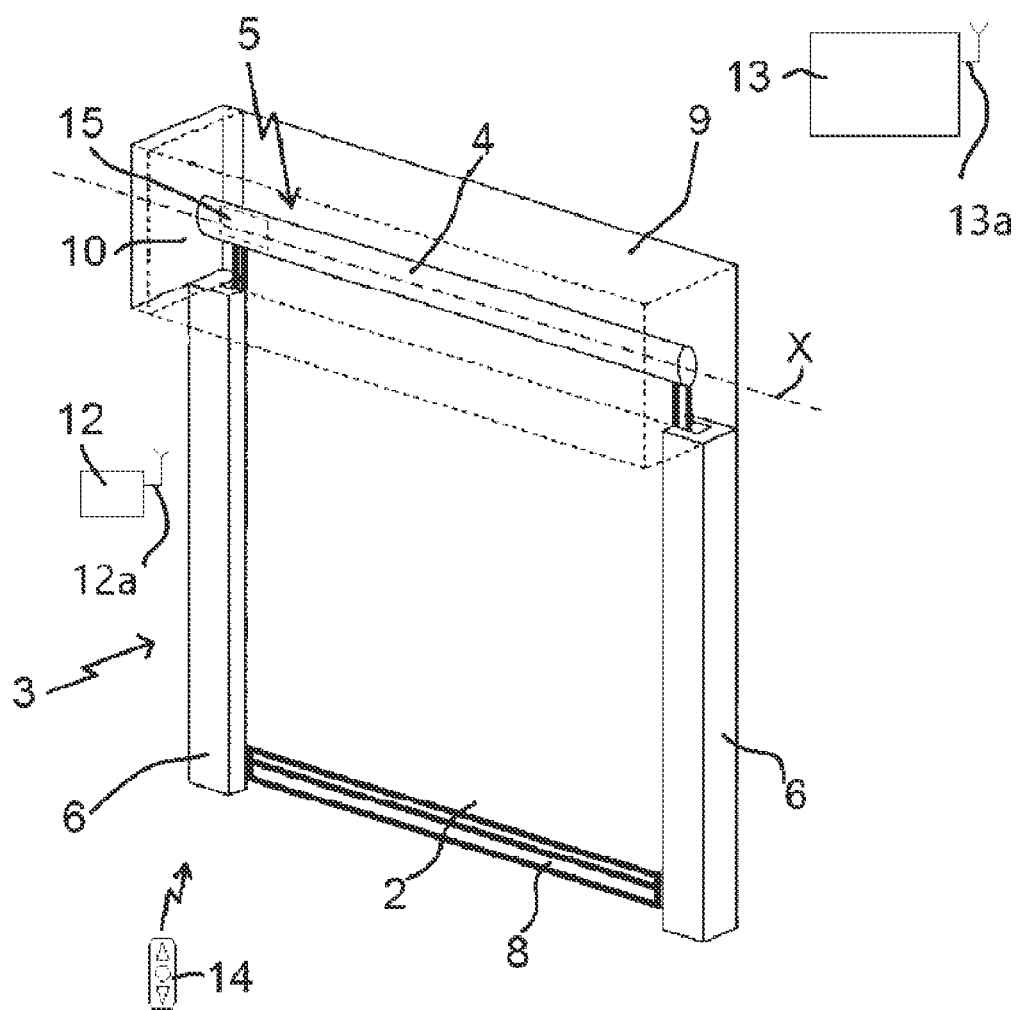
FIG. 2 is a schematic perspective view of the system shown in FIG. 1.

First of all, with reference to FIGS. 1 and 2, we will describe a home automation system 100 in accordance with the invention and installed in a building B comprising an opening 1 that is a window or door, equipped with a screen 2 belonging to a blackout device 3, in particular a motorised roller blind.

The blackout device 3 can alternatively be a roller shutter, a blind with adjustable slats, or a roller door. In practice, the present invention is applicable to all types of blackout device comprising a motorised rotating winding shaft.

Figure 3:
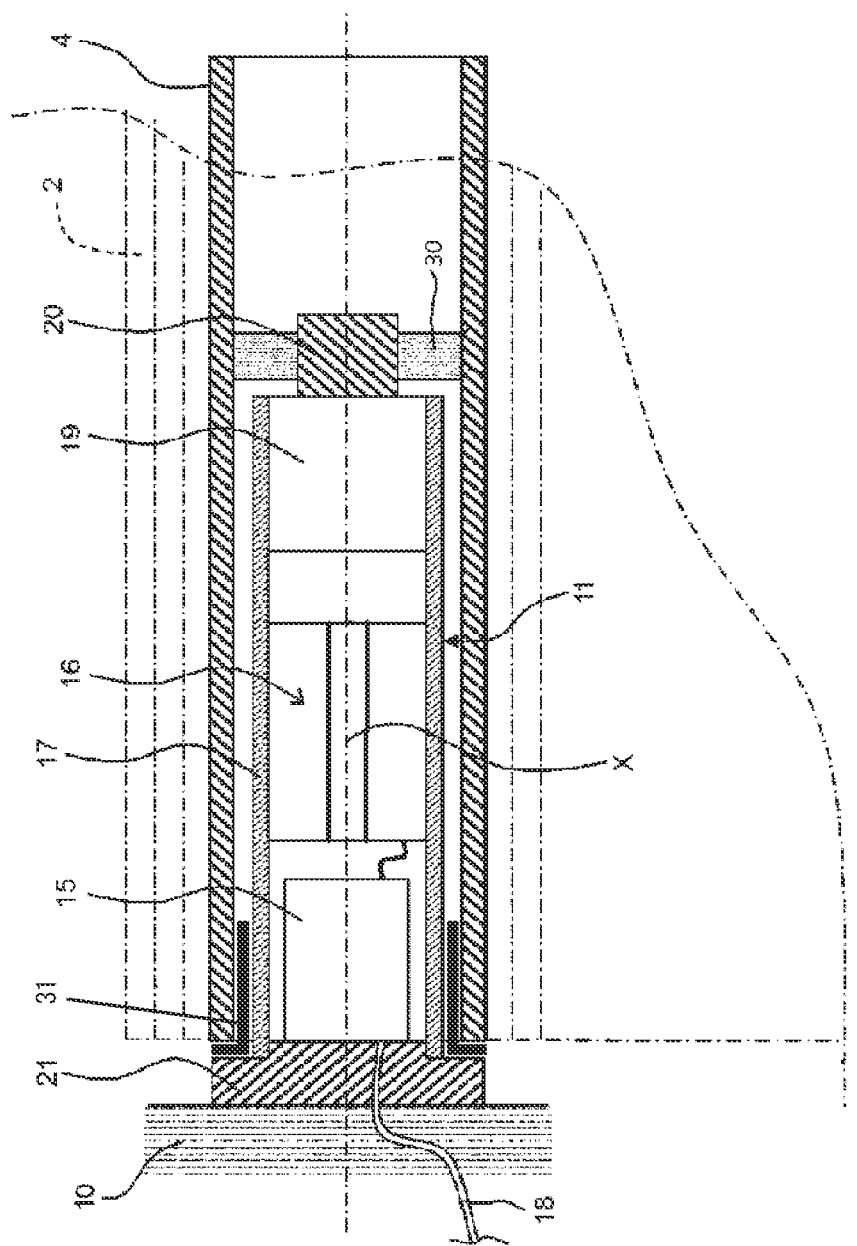
FIG. 3 is a schematic cross-section of an electromechanical actuator of the system shown in FIGS. 1 and 2, along a sectional plane passing through an axis of rotation of an output shaft of the electromechanical actuator.

With reference to FIGS. 1 to 3, a motorised blind according to one embodiment of the invention will be described.

The screen 2 of the blackout device 3 is wound onto a winding shaft 4, which is provided in the form of a winding tube and is driven by a motorised drive 5. The screen 2 can be moved between a rolled-up position, in particular a high position, and an unrolled position, in particular a low position.

The motorised drive 5 comprises an electromechanical actuator 11, in particular of the tubular type, for rotating the winding tube 4 so as to unwind or wind up the screen 2 of the blackout device 3.

The blackout device 3 comprises the winding tube 4 for rolling up the screen 2. In the installed state of the home automation system 100, the electromechanical actuator 11 is inserted into the winding tube 4.

Both the electromechanical actuator 11 and the winding tube 4 are positioned coaxially along a longitudinal axis X. The inner diameter of the winding tube 4 is substantially equivalent to the outer diameter of the electromechanical actuator 11, such that the electromechanical actuator 11 can be inserted into the winding tube 4 when assembling the blackout device 3.

In a known way, the screen 2 of the roller shutter 3 is formed by a fabric, which is attached at one end to the winding tube and at the other end to a weighted bar 8.

The rolled-up position of the screen corresponds to the position of the weighted bar at the winding tube and the unrolled-down position corresponds to the position of the weighted bar 8 of the screen 2 at the threshold 7 of the opening 1. The deployment of the screen can be guided by slides 6.

The winding tube 4 can be placed inside a box 9 or be visible. The winding tube 4 is rotatable in relation to a support 10, such as a lateral plate, of the box 9.

The motorised drive 5 is controlled by a control unit. The control unit may be, for example, a local control unit 12, where the local control unit 12 may be connected in a wired or wireless manner to a central control unit 13. The control unit 12 is shown here in a radio version with an antenna 12a. The central control unit 13 controls the local control unit 12 and other similar local control units distributed throughout the building. It is shown here with a radio antenna 13a.

The central control unit 13 may be in communication with one or more sensors, not shown, which may be configured to determine, for example, temperature, or indoor or outdoor brightness.

A remote control 14, which may be a type of local control unit, provided with a control keyboard, which comprises selection and possibly display means, further allows a user to intervene on the electromechanical actuator 11 and/or the local control unit 12 and/or central control unit 13.

The motorised drive 5 is preferably configured to execute the commands for unrolling or rolling up the screen 2 of the blackout device 3, which can be issued by the remote control 14, the local control unit 12, the central control unit 13 or a sensor, among others.

The electromechanical actuator 11 belonging to the home automation system of FIGS. 1 and 2 will now be described in more detail with reference to FIGS. 3 and 4.

The electromechanical actuator 11 comprises an electric motor 16. The electric motor 16 comprises a stator 32 and a rotor 34 positioned coaxially about the longitudinal axis or axis of rotation X.

Means for controlling the electromechanical actuator 11, allowing the movement of the screen 2 of the blackout device 3, are constituted by at least one electronic control unit 15. This electronic control unit 15 is able to operate the electric motor 16 of the electromechanical actuator 11 and, in particular, to enable the supply of electrical energy to the electric motor 16. Thus, the electronic control unit 15 controls, in particular, the electric motor 16, so as to open or close the screen 2, as described above.

The electronic control unit 15 further comprises a module 15a for receiving orders, in particular radio commands emitted by a command transmitter, such as the remote control 14, for controlling the electromechanical actuator 11. The order-receiving module 15a may also allows the reception of orders transmitted by wired means.

Here, and as illustrated in FIG. 3, the electronic control unit 15 is disposed inside a housing 17 of the electromechanical actuator 11.

The means of controlling the electromechanical actuator 11 comprises hardware and/or software means. As a non-limiting example, the hardware means may comprise at least one microcontroller 27.

The electromechanical actuator 11 is supplied with electrical energy from a building's electrical supply network, for example from the mains AC network or a DC bus, or by means of a battery not shown, which can be recharged, for example, by a photovoltaic panel. Here, the electromechanical actuator 11 includes a power supply cable 18 for supplying electrical energy from the mains power supply.

In another embodiment not shown, the electromechanical actuator 11 is intended to be located in a U-shaped rail and is intended to rotate a winding shaft on which cords associated with the screen are wound.

The housing 17 of the electromechanical actuator 11 is preferably cylindrical. In one embodiment, the housing 17 may be made of a metallic material. The material of the housing of the electromechanical actuator is by no means limiting and may be different, in particular it may be plastic.

The electromechanical actuator 11 further comprises a gearbox 19, in particular an epicyclic gearbox, and an output shaft 20. Advantageously, the electric motor 16 and the gearbox 19 are arranged inside the housing 17 of the electromechanical actuator 11.

The output shaft 20 of the electromechanical actuator 11 is arranged inside the winding tube 4 and, at least partly, outside the housing 17 of the electromechanical actuator 11.

The output shaft 20 of the electromechanical actuator 11 is coupled to the winding tube 4 via a connecting accessory 30, in particular a wheel-shaped connecting accessory.

The electromechanical actuator 11 also comprises a torque support 21, mounted at an end of the housing 17 opposite the output shaft 20 and sealing the end of the housing 17. The housing 17 and the torque support 21 are rotationally fixed with respect to each other.

The torque support 21 of the electromechanical actuator 11 is attached to the support 10 of the box 9 of the blackout device 3. The torque support 21 is also called the "fixed point" of the electromechanical actuator 11.

The electromechanical actuator 11 further comprises a bearing ring 31 mounted on the housing 17 and free to rotate relative to the housing 17. The bearing ring 31 is rotatably attached to the winding tube 4, so that the bearing ring 31 provides a rotational bearing function of the winding tube 4 on the housing 17, close to the torque support 21.

The actuator may also include devices not shown for suspending the motor or the assembly of electric motor 16 and gear reduction device 19. These suspension devices are, for example, known from EP1727959A1 and make it possible to limit the transmission of vibrations, generated in this assembly, to the closure or sun protection system and thus to limit the noise generated during operation of the electromechanical actuator 11. These suspension devices cause an elasticity within the electromechanical actuator, between the torque support 21 and the rotating output shaft 20. They therefore allow a controlled angular deformation to be introduced, about the X axis, between the torque support 21 and the rotating output shaft 20, and thus facilitate the implementation of the obstacle detection method described below.

Here, the electric motor 16 is of the electronically commutated brushless direct-current type or "BLDC" for short, or more generally, of the permanent magnet synchronous motor type or "PMSM" for short.

The rotor 34 of the electric motor 16 comprises a rotor body provided with magnetic elements surrounded by the stator 32. Here, the magnetic elements are permanent magnets.

The stator 32 of the electric motor 16 comprises a stator core comprising pole elements distributed around the periphery of the stator 32. The pole elements are also called teeth.

Figure 4:
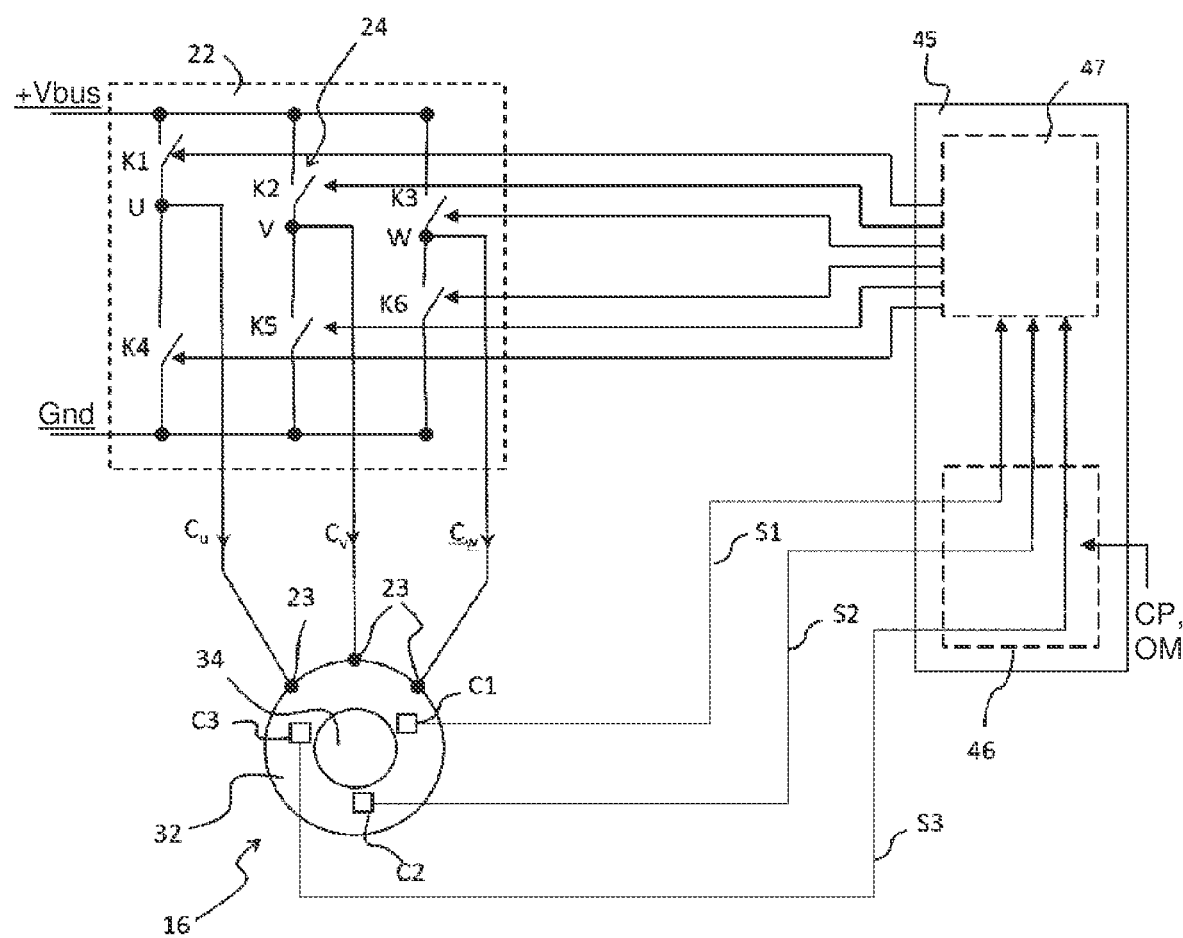
FIG. 4 is an electrical diagram of an electric motor belonging to the electromechanical actuator of FIG. 3 and its surroundings, which actuator comprises a first position detection device according to a first embodiment.

The stator 32 of the electric motor 16 comprises windings 23, in this case three, electrically connected to each other, as illustrated schematically in FIG. 4.

Preferably, the windings 23 are positioned around the pole elements of the stator 32. More specifically, each pole element is surrounded by its own winding 23. The windings 23 are connected to each other in such a way that when current flows through them, they produce a rotating electromagnetic field which rotates the rotor 34.

The electronic control unit 15 of the electromechanical actuator 11 comprises a rectifier circuit for the AC voltage of the power supply network and a power supply module 22. The power supply module 22 is thus electrically connected to a +Vbus DC voltage source. The value of the DC voltage +Vbus is defined in relation to a reference voltage Gnd. Alternatively, the circuit for rectifying the AC voltage of the power supply network may be external to the electromechanical actuator 11.

The power supply module 22 supplies electrical power sequentially to the windings 23 so as to produce the rotating electromagnetic field that causes the rotor 34 of the electric motor 16 to rotate.

The power supply module 22 comprises switches 24 to provide sequential power to the windings 23.

Here, the switches 24 of the power supply module 22 are MOSFETs (Metal Oxide Semiconductor Field Effect Transistors), of which there are six. They are labelled K1, K2, K3, K4, K5 and K6 in FIG. 4.

The type and number of switches 24 of the power supply module are not limiting. In particular, the switches 24 of the power supply module 22 may be IGBTs (Insulated Gate Bipolar Transistors).

The electronic control unit 15 of the electromechanical actuator 11 also comprises sensors C1, C2, C3, securely positioned with respect to the stator 32, preferably integrated therein. Preferably, these sensors 18, 20 are Hall effect sensors with binary output. Preferably, these sensors are positioned at 60° or 120° to each other about the X-axis, within the stator 32. These sensors are able to provide an angular position of the rotor 34 of the electric motor 16 about the X-axis and thus an equivalent angular position of the output shaft 20 of the electromechanical actuator 11. This angular position of the rotor is particularly used to control the switches 24.

The number of sensors C1, C2, C3 is not necessarily equal to 3. There may also be no physical sensor C1, C2 or C3. The number of sensors can also be 1, 2 and 4 or more. In this case, the distribution of the sensor(s) around the X axis is adapted according to their number.

In particular, a control unit 45 is configured to drive the electric motor 16 to move the screen 2 to a desired position.

For example, the control unit 45 is configured to drive the electric motor 16 using a pulse width modulation (PWM) technique. The control unit 45 is particularly configured to drive the electric motor 16 taking into account the angular position of the rotor 32, for example measured by the sensors C1, C2, C3. In fact, the output signals S1, S2, S3 from the sensors C1, C2, C3 feed an algorithm for generating control signals, executed by the module 45, which makes it possible to determine the times at which the control signals are sent to the switching module 22. The control unit comprises a control circuit 46, comprising a microprocessor. The control circuit 46 may comprise a command reception input, for receiving position commands CP and/or movement commands OM, such as, for example, opening or closing the screen 2, from, for example, a local control unit 12, a remote control 14, a central control unit 13 or a sensor of the system 100.

The control circuit 46 may comprise a signal output interface 47, which outputs the control signals for driving the switches 24 marked K1 to K6.

The power supply module 22 and the control unit 45 are at least partly part of the electronic control unit 15 of the electromechanical actuator 11.

The electronic control unit 15 of the electromechanical actuator 11 comprises a device for detecting obstacles and limit switches during the winding up of the screen 2 and during the unwinding of that screen. This device will be described in more detail below, with reference to FIGS. 4 to 7.

The electromechanical actuator 11 comprises a first position detection device 36, adapted to define an angular position of the rotor 34 about the X axis. According to an embodiment shown in FIG. 4, the first position detection device comprises sensors C1, C2, C3, fixedly positioned with respect to the stator 32.

Figure 5:
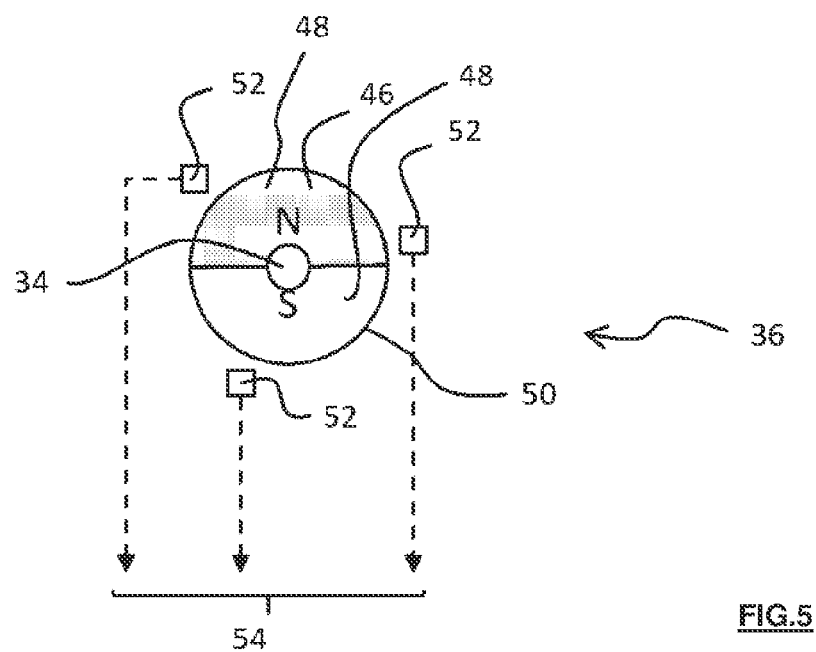
FIG. 5 is a schematic view of a second embodiment of the first position detection device belonging to the electromechanical actuator of FIG. 3.
Figure 6:
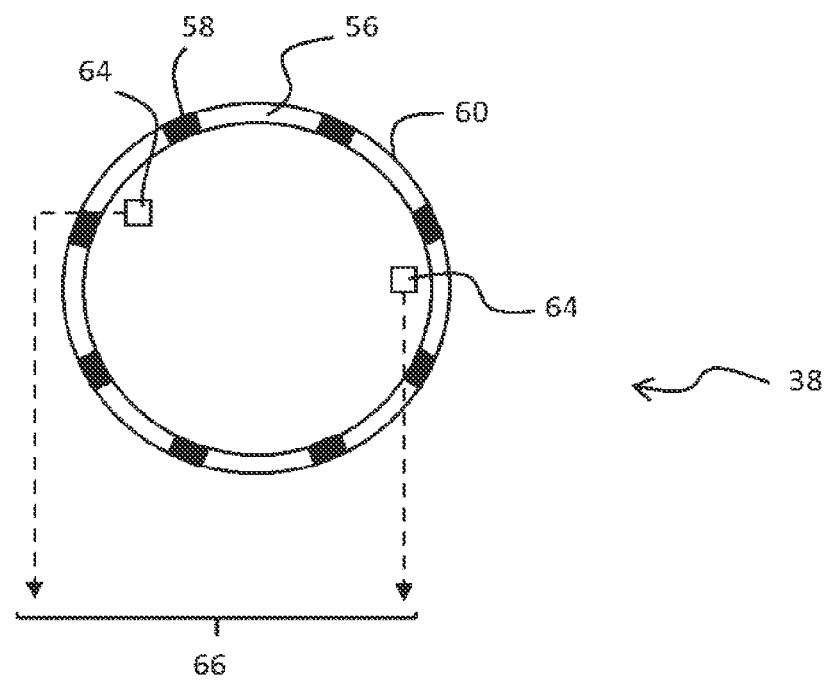
FIG. 6 is a schematic view of a first embodiment of the second position detection device belonging to the electromechanical actuator of FIG. 3.

According to a second alternative embodiment shown in FIG. 5, the first detection device 36 comprises, on the one hand, a wheel 46 called an encoder wheel, comprising magnetised sectors 48 whose polarity is alternated on the circumference 50 of the encoder wheel 46. The encoder wheel 46 may comprise two or more magnetic sectors. The encoder wheel 46 cooperates with the rotor 34 and is driven in rotation by the rotor 34. In the example shown in FIG. 5, the encoder wheel 46 is mounted on one end of the rotor 34, projecting axially from the stator 32 and located opposite the output shaft 20 of the electromechanical actuator 11.

The first position detection device 36 further comprises a first sensor device 52, comprising one or more magnetic sensors, for example Hall-effect or magneto-resistive sensors, positioned opposite the encoder wheel 46. The first sensor arrangement 52 is also part of or connected to the control unit and may comprise sensors C1, C2, C3. The signals 54 from the first sensor device 52, which are generated by the rotation of the encoder wheel 46 relative to the first sensor device 52, are transmitted to the microcontroller 27 of the electronic control unit 15 and the angular displacement of the rotor 34 and/or the angular position of the rotor 34 is determined from these signals 54.

According to an alternative embodiment not shown, the first position detection device 36 comprises hardware and software means for determining the position of the rotor 34 without a specific physical sensor measuring the rotation of the rotor. Such hardware and software means are, for example, described in application WO2014207387A1.

Any other type of electric motor is also possible, with a suitable power supply and control, as well as a corresponding first position detection device 36. Thus, for example, if the motor is a DC motor incorporating a brush and commutator arrangement, the first position sensing arrangement comprises means for counting brush passes at the commutator during motor rotation. Alternatively, if the electric motor is an AC powered asynchronous motor, the first position detection device comprises magnetic sensors, for example positioned at the output of the electric motor 16.

The electromechanical actuator 11 also comprises a second position detection device 38, adapted to define an angular position of the winding shaft 4 about the X-axis.

The second position detection device 38 similarly comprises a magnetised rotating element 56 to the first position detection device 36. In a first embodiment illustrated in FIG. 6, the magnetised rotating member 56 comprises and supports discrete magnets 58, mounted on a rotating support 60 in an alternating manner, i.e. such that the rotating member 56 has a radial periphery or axial face with alternating magnetised sectors 40.

Figure 7:
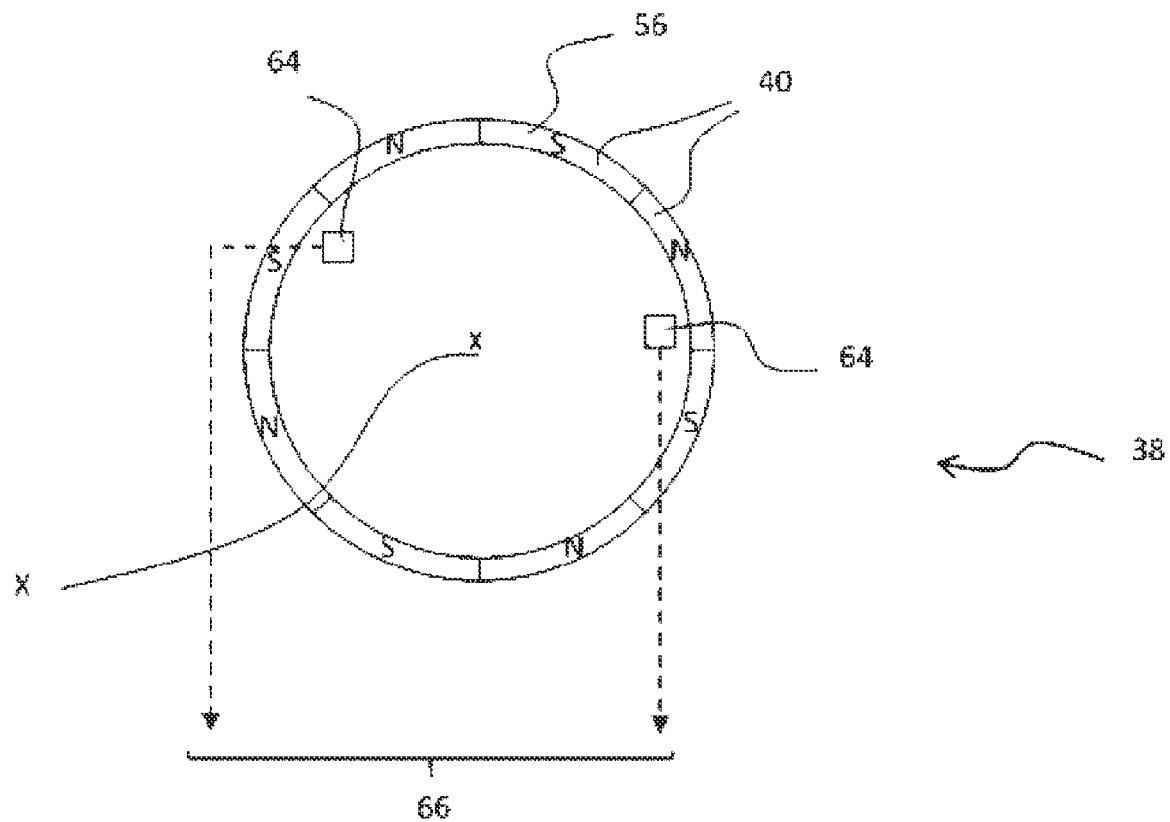
FIG. 7 is a schematic view of a second embodiment of the second position detection device belonging to the electromechanical actuator of FIG. 3.

In a second embodiment shown schematically in FIG. 7, the magnetised rotating element 56 comprises a polarised ring. The rotating element 56 is freely rotatable relative to the torque support 21 or the housing 17 of the electromechanical actuator 11. It is adapted to be rotated about the X-axis via the output shaft 20 of the electromechanical actuator 11, in particular adapted to be rotated by the winding shaft 4, which is rotatably coupled with the output shaft 20 of the electromechanical actuator 11.

The second detection device 38 further comprises a second sensor device 64 comprising one or more magnetic sensors, for example one-, two- or three-dimensional Hall effect or magneto-resistive sensors, positioned opposite the rotating element 56. The second sensor device 64 is also part of the electronic control unit 15 or is connected to it. The signals 66 from the second detection device 38, which are generated by the rotation of the magnetised rotating element 56 relative to the second sensor device 64, are transmitted to the microcontroller 27 of the electronic control unit 15 and the position or angular displacement of the rotating element 56 is determined from these signals 66.

The second position detection device 38 is adapted to determine the rotation about the X-axis of the bearing ring 31 with respect to the housing 17 or the torque support 21 of the electromechanical actuator 11. The bearing ring 31 thus corresponds to the rotating element 56. The bearing ring 31 comprises at least two magnetic sectors 40 evenly distributed on a circumference or face opposite a magnetic sensor device 64 arranged in the housing 17 of the electromagnetic actuator 11.

In particular, the first position detection device 36 is used to determine the position of the rotor 34 for controlling the electric motor 16, especially in the case of a PMSM type motor with electronic commutation. Its accuracy is required to enable this steering in particular.

The arrival of the screen 2 in particular pre-learned positions, for example end positions, can be managed either by the first position detection device 36 or by the second position detection device 38. At least one of the two devices must therefore be sufficiently precise to manage the arrival in extreme positions, according to market requirements, in particular to manage the visual alignment of two weighted bars 8 of two screens 2 placed side by side.

A preferred embodiment of the electromechanical actuator 11 comprises an electronically commutated "permanent magnet synchronous" electric motor or a brush and commutator DC motor, wherein only the second detection device 38 comprises magnetic or optical sensors adapted to determine the angular displacement of the winding shaft. In this preferred embodiment, the arrival of the screen 2 in end positions is managed by the second position detection device 38.

The second position detection device 38 is used in combination with the first position detection device 36 for obstacle management. The two position detection devices 36, 38 may have different accuracies. The accuracy constraint is more important for the management of extreme positions, managed by only one of the two counters, than for obstacle detection, based on the two position detection devices 36 and 38.

The electronic control unit 15 comprises hardware means, such as the microcontroller 27, and software for processing the data from the two position detection devices 36, 38 so as to determine from the data provided by the first position detection device 36 and by the second position detection device 38 a value of angular displacement of the rotor 34 with respect to the stator 32 and a value of angular displacement of the winding shaft 4 with respect to the casing 17 or the torque support 21 of the electromechanical actuator 11. In particular, the electronic control unit 15 comprises a memory, not shown, for storing a current value and an original value of angular displacement and for storing an algorithm for implementing the obstacle detection method by this microcontroller 27.

The method for detecting an obstacle to the movement of the screen 2 in the home automation system 100 for closure or sun protection is implemented as follows.

The method comprises a step E101 of determining an angular displacement value DB of the rotor 34 with respect to the stator 32 of the electromechanical actuator 11. The determination step E101 comprises a substep of retrieving the signals 54 from the first position detection device 36 respectively.

The method comprises a step E103 of determining an angular displacement value Dϕ of the winding shaft 4 with respect to the housing 17 or the torque support 21 of the electromechanical actuator 11. The determination step E103 comprises a substep of retrieving the signals 66 from the second position detection device 38.

The signals 54, 66 from each position detection device 36, 38 can be processed and filtered.

Figure 8:
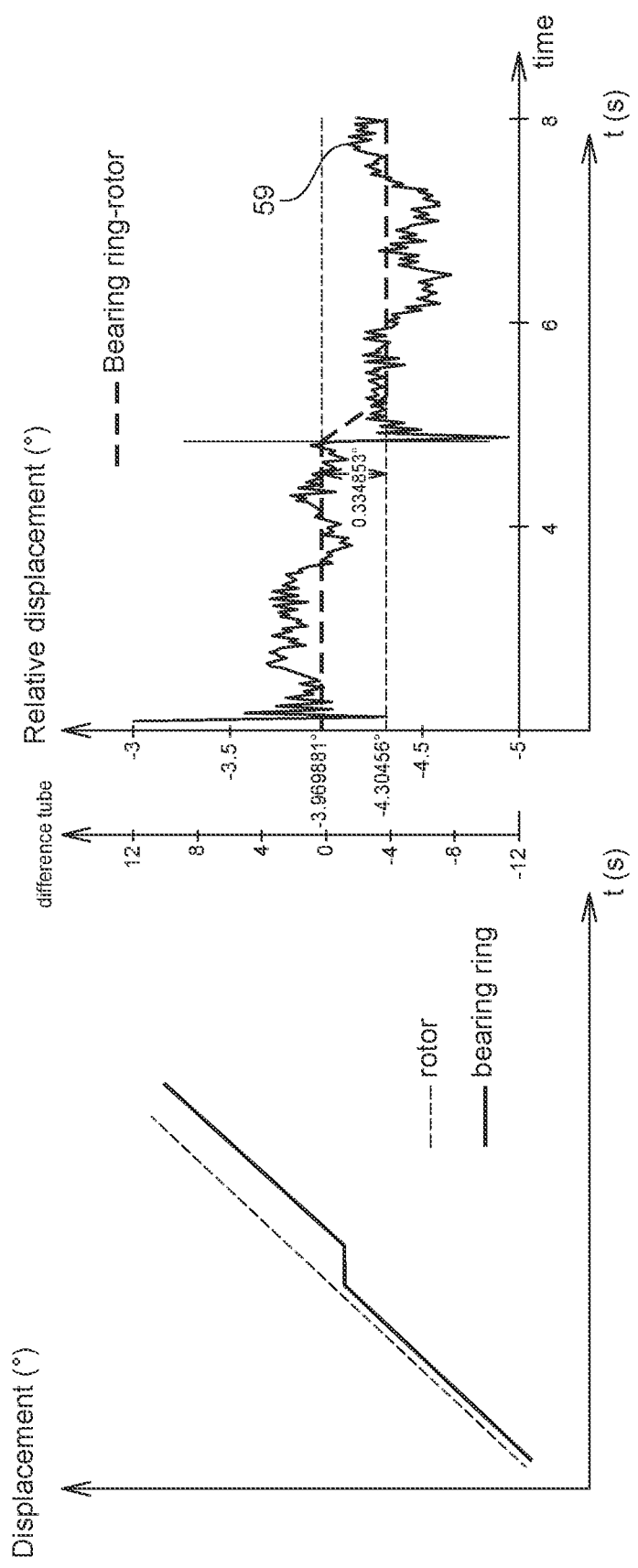
FIG. 8 illustrates several graphs showing the course of the monitored parameters in the electromechanical actuator of FIG. 3 during the implementation of the method according to the invention.
Figure 9:
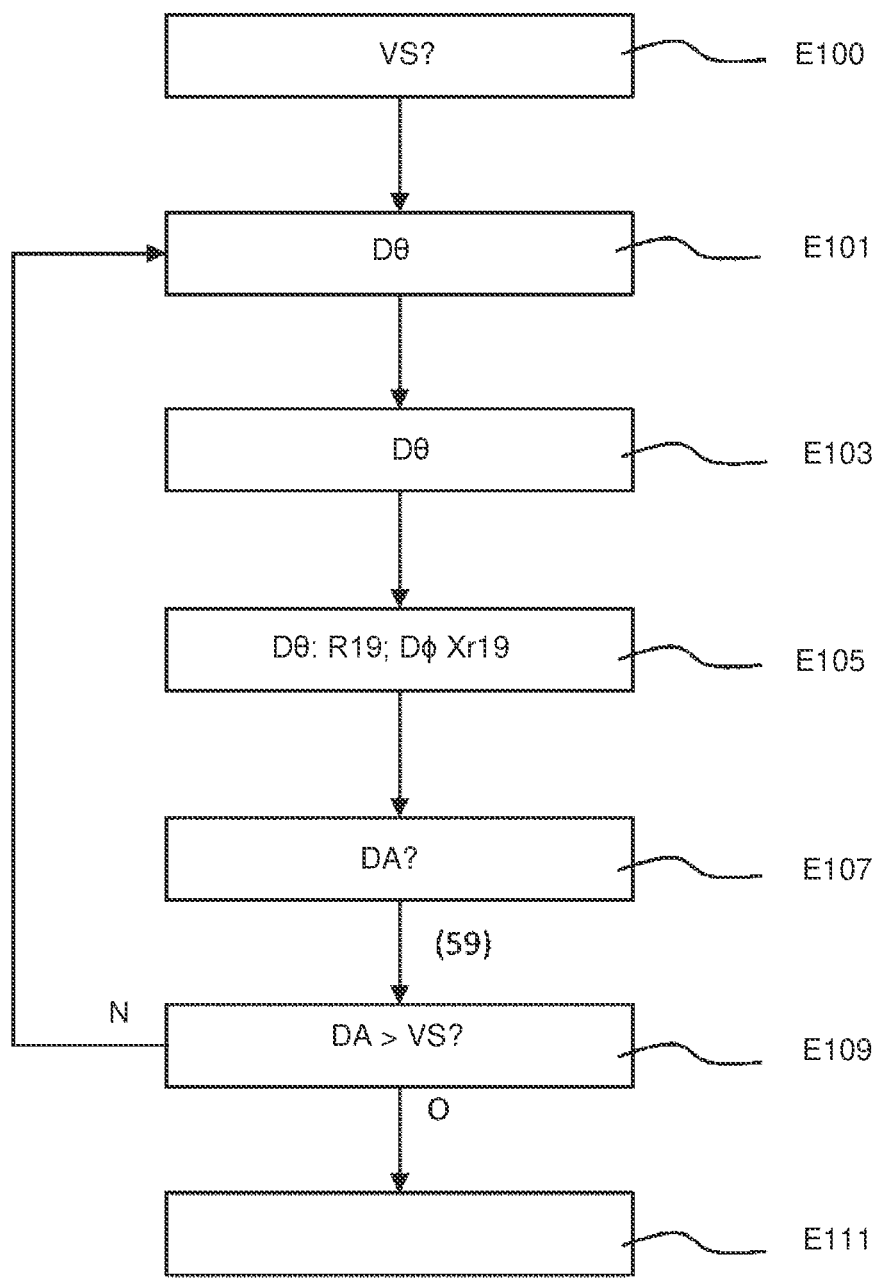
FIG. 9 is a schematic diagram showing some steps of a method implemented by the electromechanical actuator of FIG. 3 according to the invention.

Alternatively, a comparison signal 59, resulting from the comparison of the two signals 54 and 56, is processed and filtered. This comparison signal is depicted in FIG. 8.

However, signals 54 and 66 can only be compared if they are related to the same time frame. Indeed, due to the different rotational speeds of the rotor 34 and the output shaft 20, or the different rotational speeds of the rotor 34 and the winding shaft 4, by interposing the gearbox 19 between them, the time frames are not the same. In other words, the angular displacements Dθ and Dϕ respectively from signals 54 and 66 can only be compared if one of them is related to the other by conversion using as a multiplication or division factor the reduction ratio of the gearbox 19, this being defined hereafter, by convention, as greater than 1. In particular, the signal 54 is made comparable to the signal 66 by division by the reduction ratio of the gearbox 19, i.e. the angular displacement Dθ is made comparable to the angular displacement Dϕ by dividing it by the reduction ratio R19 of the gearbox 19. Conversely, the signal 66 is made comparable to the signal 54 by multiplying by the reduction ratio of the gearbox 19, i.e. the angular displacement Dϕ is made comparable to the angular displacement Dθ by multiplying it by the reduction ratio R19.

In other words, the method comprises a step of converting E105 the angular displacement value of the rotor 34 into an equivalent angular displacement data of the winding shaft 4. The equivalent angular displacement data is obtained by dividing or multiplying the angular displacement value of the rotor 34 by the theoretical reduction ratio R19 of the gearbox 19 of the electromechanical actuator 11.

Alternatively, the conversion step may act on the angular displacement data of the winding shaft 4 or the output shaft 20, so as to convert it into an equivalent angular displacement data of the rotor 34. By comparing the angular displacement and equivalent angular displacement values, it is possible to verify the presence or absence of an obstacle in the path of the screen 2.

The method comprises a step E107 of determining an angular deformation DA of the kinematic chain between the electric motor 16 and the winding shaft 4 by comparing the angular displacement values obtained in the previous steps E101 and E105 or E103 and E105, i.e. by analysing the comparison signal 59 resulting from the comparison of the two signals 54 and 56.

The method then comprises a step of determining E109 the presence of an obstacle to the movement of the screen 2 from a comparison of an angular deformation value DA determined in step E107 of the kinematic chain with a predefined threshold value VS of angular deformation. An obstacle is considered to be present if the angular deformation determined in step E107 is greater than the predefined angular deformation threshold value VS.

If the angular deformation value DA is greater than the threshold value VS, an alarm is activated in a step E111. If not, the method resumes at step E101.

In view of the structure of the electromechanical actuator 11 in the system 100, angular deformation is only possible if the kinematic chain is capable of allowing such angular deformation. A first option is to add a deformation element 70 in the kinematic chain between the exit of the rotor 34 and the point of attachment of the winding tube 4 to the bearing ring 31. This first option will be discussed in more detail below.

A second option is to make use of the elastic properties of the materials of the various components of the kinematic chain, in particular torsional elasticity properties, especially when a suspension device is integrated into the electromechanical actuator, as described above. The response of the electromechanical actuator 11 to an obstacle will in this second option be slower than a specifically adapted deformation element.

In particular, a deformation element 70 can be added in the kinematic chain between the exit of the rotor 34 and the point of attachment of the winding tube 4 to the bearing ring 31.

It is known that in order to detect an obstacle on one side of the weighted bar 8 of the screen 2, it is necessary to be able to measure a variation in torque of 0.02 Nm to 0.15 Nm depending on the torque required to motorise the screen. In some cases, additional elasticity must be added to the kinematic chain. This can be achieved by a deformation element 70 such as a spring device, arranged either at the connecting accessory 30 of the output shaft 20 of the electromechanical actuator 11 to the winding tube 4, or at the output shaft 20 itself. This deformation element 70 adds elasticity to, or decreases the stiffness of, the kinematic chain between parts 34 and 4, making it easier and quicker to observe angular position differences measured by the first position detection device 36 and the second position detection device 38.

Figure 10:
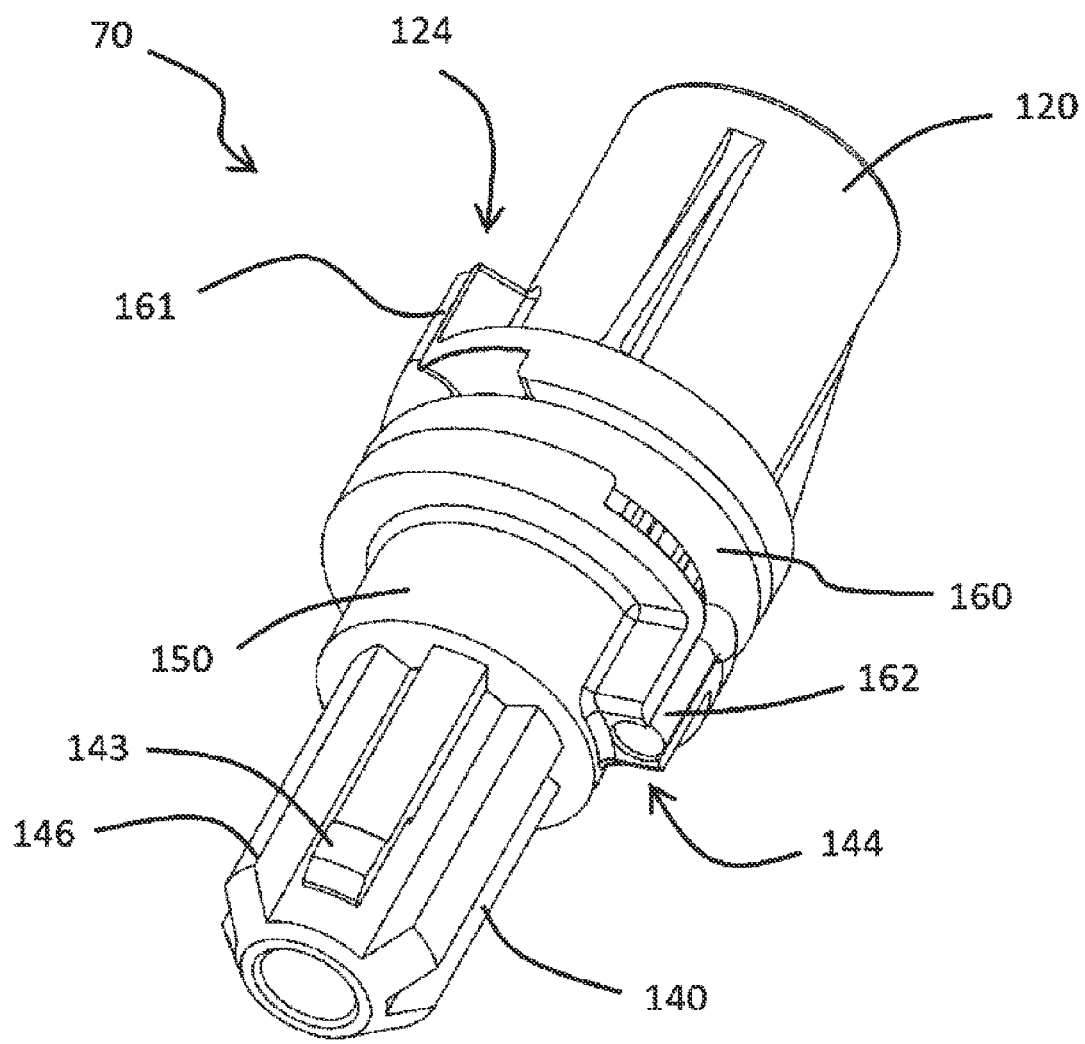
FIG. 10 is a schematic perspective view of an accessory of the electromechanical actuator of FIG. 3.
Figure 11:
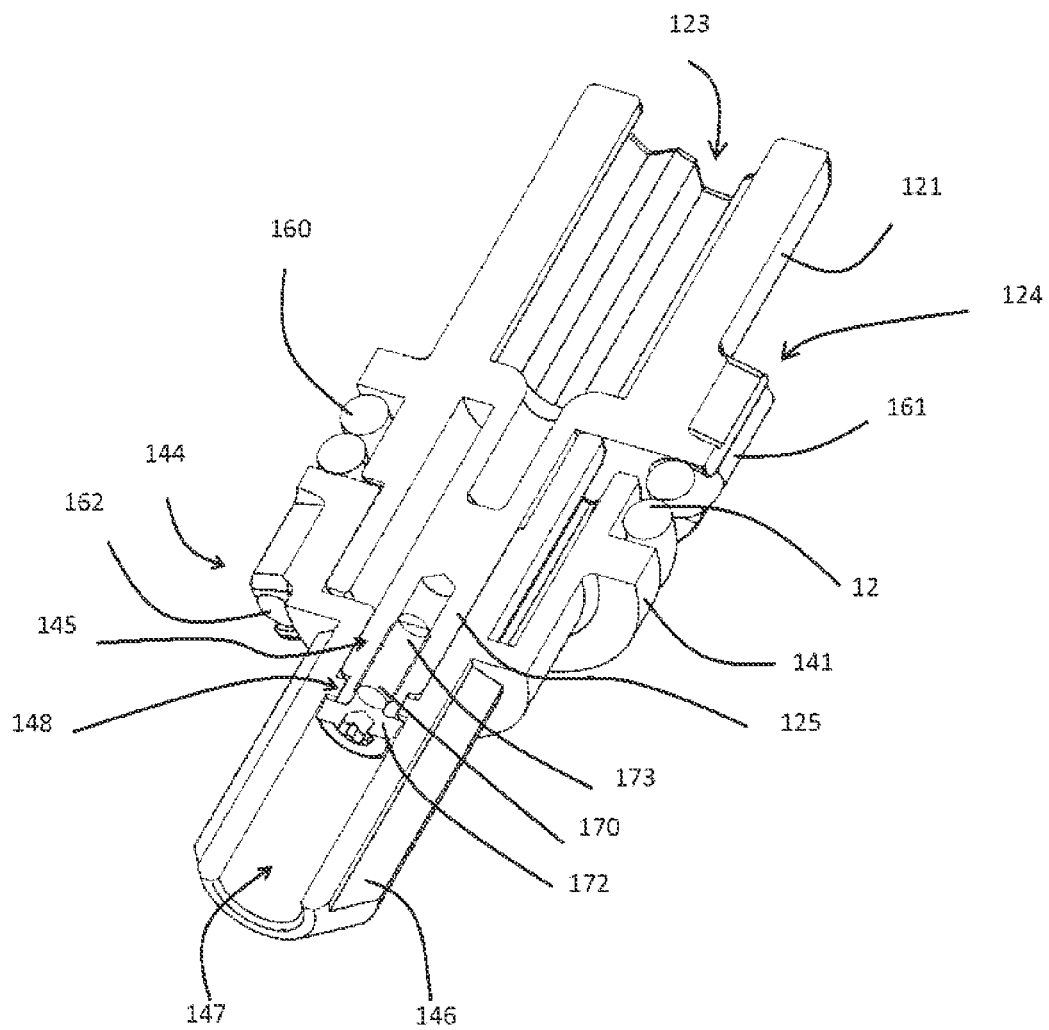
FIG. 11 is a schematic perspective cross-section of the accessory in FIG. 10, along a sectional plane passing through the axis of rotation of the output shaft of the electromechanical actuator.
Figure 12:
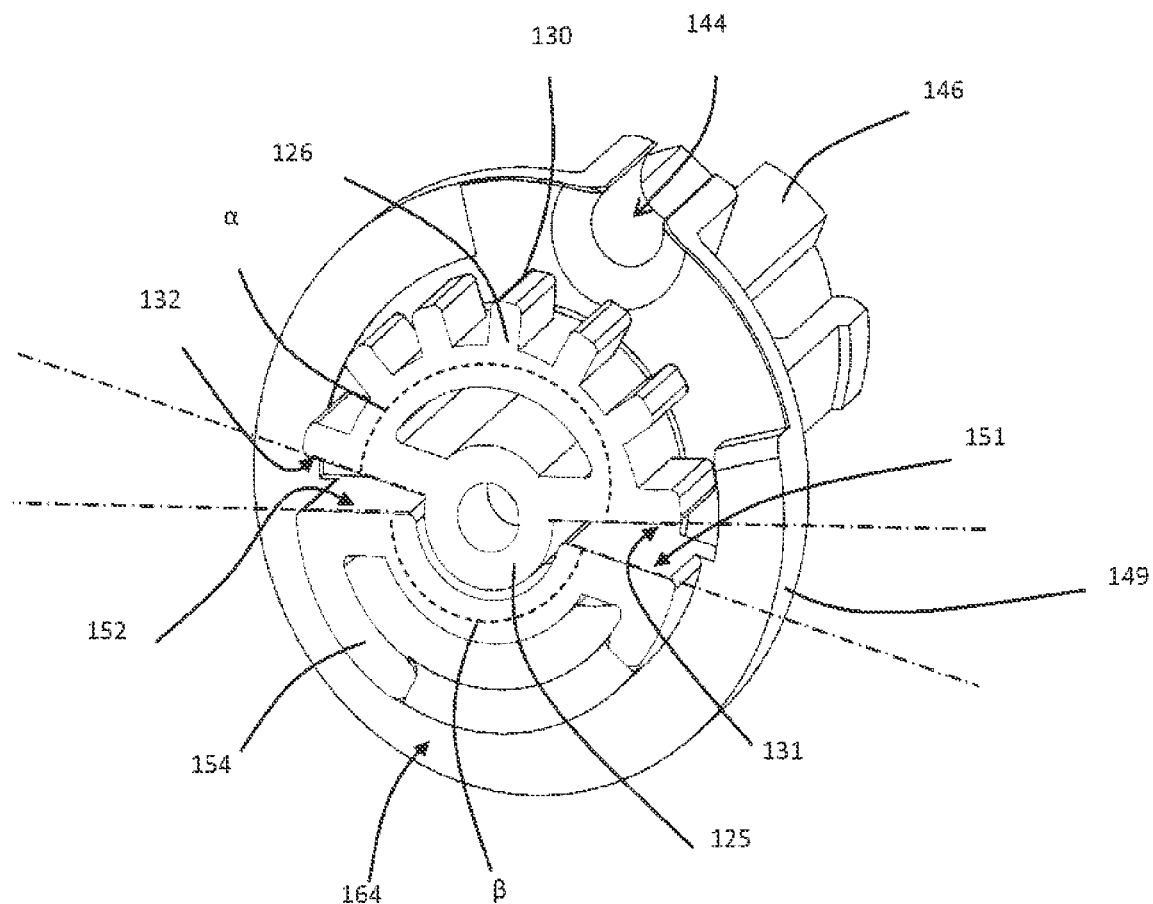
FIG. 12 is a schematic perspective cross-section of the accessory in FIG. 10, along a sectional plane orthogonal to the axis of rotation of the output shaft of the electromechanical actuator.

According to the embodiment of the deformation element 70 shown in FIGS. 10 to 12, the output shaft 20 comprises two distinct parts: an upstream part 120 of the output shaft 20 is rotationally fixed with the output of the gearbox 19 and a downstream part 140 adapted for attachment to the winding shaft 4, for example by means of a connecting fitting 30. The upstream part 120 comprises a body 121 from which a rod 125 extends. The body 121 further comprises a splined internal recess 123, adapted to cooperate with an output shaft not shown of the gearbox 19, opposite the shaft 125. At the periphery of the body 121 there is also a longitudinal groove 124.

A semi-cylindrical block 126 also extends from the body 121. The block 126 comprises an outer surface 130 and two abutment surfaces 131, 132 on either side of the block 126 extending the outer surface 130 towards the rod 125. The semi-cylindrical block 126 extends partially around the rod 125, being integral with the rod 125.

The downstream part 140 has a first end 141 which comprises a longitudinal groove 144 on its outer periphery. A second end 142 of the downstream part 140 is provided with grooves 146 and clips 143 on its outer perimeter, suitable for fixing the connecting accessory 30 to this downstream part 140 by clipping. The downstream part 140 is rotatably mounted on the upstream part 120, for example by cooperation of the rod 125 of the upstream part 120 and a corresponding first cylindrical recess 145, internal to the downstream part 140 and formed partly in the first end 142.

Both the upstream 120 and downstream 140 parts are held in position relative to each other by a resilient device 160, such as a coil spring, of which a first bent leg 161 is locked in the groove 124 of the upstream part 120 and a second bent leg 162 is locked in the groove 144 provided on the downstream part 140. The coils of the spring 160 are held, especially on the inner diameter of the spring, by the outer surface 130 of the upstream part and by a corresponding half cylinder 154 on the downstream part 140. The first and last coils of the spring are held axially on ramps 164, only one of which is visible in FIG. 12. Both the upstream 120 and downstream 140 parts are also held axially with respect to each other by means of a screw 170, provided with a head 172 and a threaded rod 173, the screw 170 not preventing the rotation of the downstream part 140 with respect to the upstream part 120. The screw head 172 is therefore free to rotate relative to the downstream part 140. The screw is inserted through a second cylindrical recess 147 opening out at the first end 141 of the downstream part 140 and joining the first cylindrical recess 145 via a circular passage 148 whose diameter is slightly larger than the diameter of the threaded rod 173 of the screw 170, but smaller than the diameter of the screw head 172.

The first cylindrical recess 145 is partially extended axially by a semi-cylindrical block 149. The block 149 further comprises an outer surface 150 and two abutment surfaces 151, 152 on either side of the block joining the outer surface 150 and an inner wall 153 extending from the cylindrical recess 145.

When the upstream part 120, the downstream part 140 and the spring 160 are assembled, the semi-cylindrical block 126 of the upstream part 120 is opposite the cylindrical block 149 of the downstream part 140. The abutment surfaces 131, 132 and 151, 152 are not in contact at rest. A gap remains between the opposing abutment surfaces. In other words, the angle α formed by the surfaces 131 and 132 between them within block 126 and/or the angle β formed by the surfaces 151 and 152 between them within block 149 is strictly less than 180°. The sum of the angles α and β is strictly less than 360°.

When the downstream part 140 rotates relative to the upstream part, against the action of the spring, regardless of the direction of rotation between the downstream part 120 and the upstream part 140, angular displacement is possible, but limited by the abutment surfaces 131 and 151 or 132 and 152 which come into contact with each other.

In practice, due to the weight of the load acting on the deformation element 70, the resilient device 160 is stressed in a torsional direction. The resilient device 160 is dimensioned such that the abutment surfaces 131 or 132 only come into contact with the abutment surfaces 151 or 152 beyond a torque greater than a nominal operating moment of the electromechanical actuator 11. The lifting of the weight of the weighted bar 8 due to the presence of an obstacle in its path relieves the stress on the spring 160 and allows angular deformation of the deformation element 70. As the deformation element 70 is located in the kinematic chain between the first position detection device 36 and the second position detection device 38, the angular variation between the two signals from these position detection devices reliably indicates the presence of an obstacle.

Figure 13:
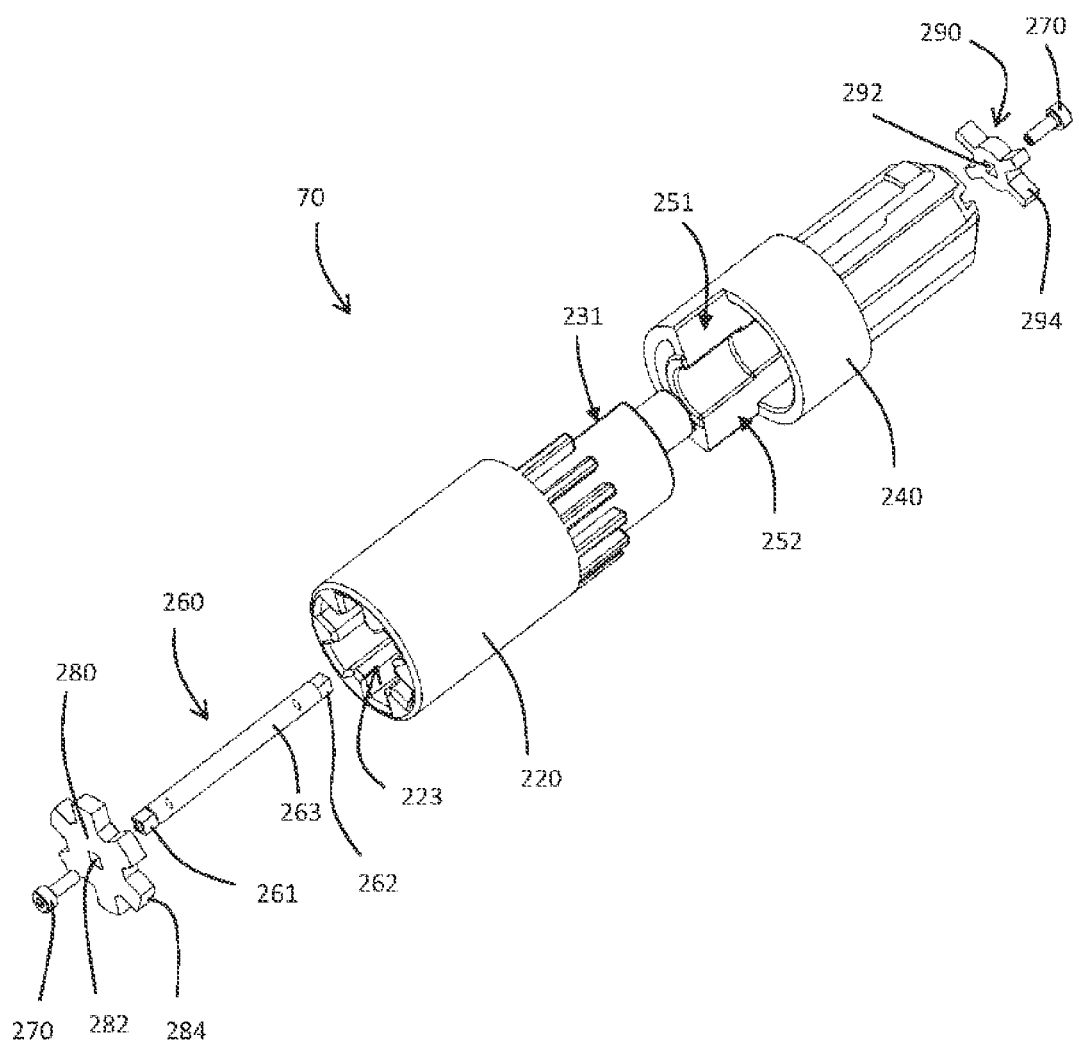
FIG. 13 is a schematic perspective view of a variant of an accessory of the electromechanical actuator of FIG. 3.
Figure 14:
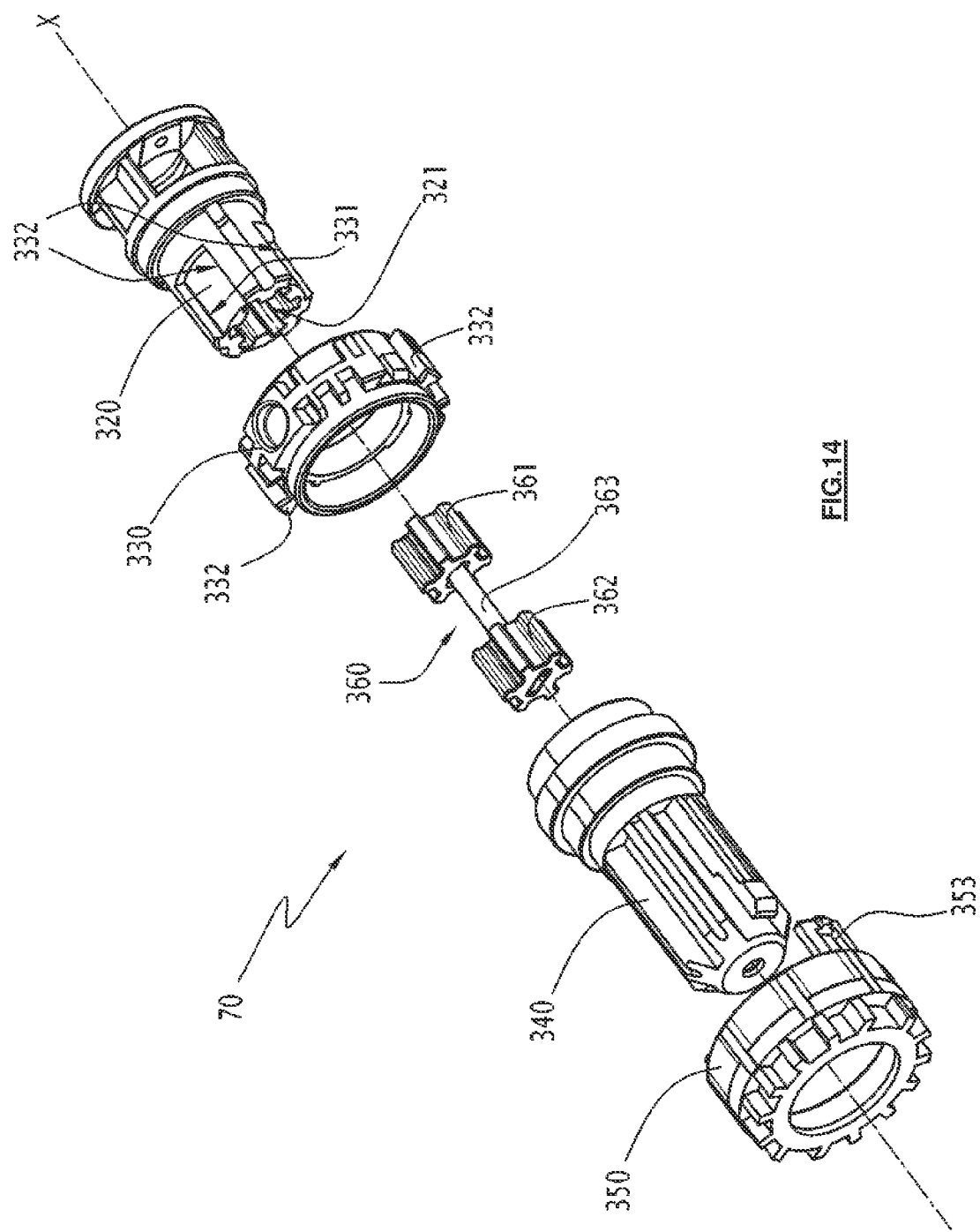
FIG. 14 is an exploded perspective view of another variant of an accessory of the electromechanical actuator of FIG. 3.
Figure 15:
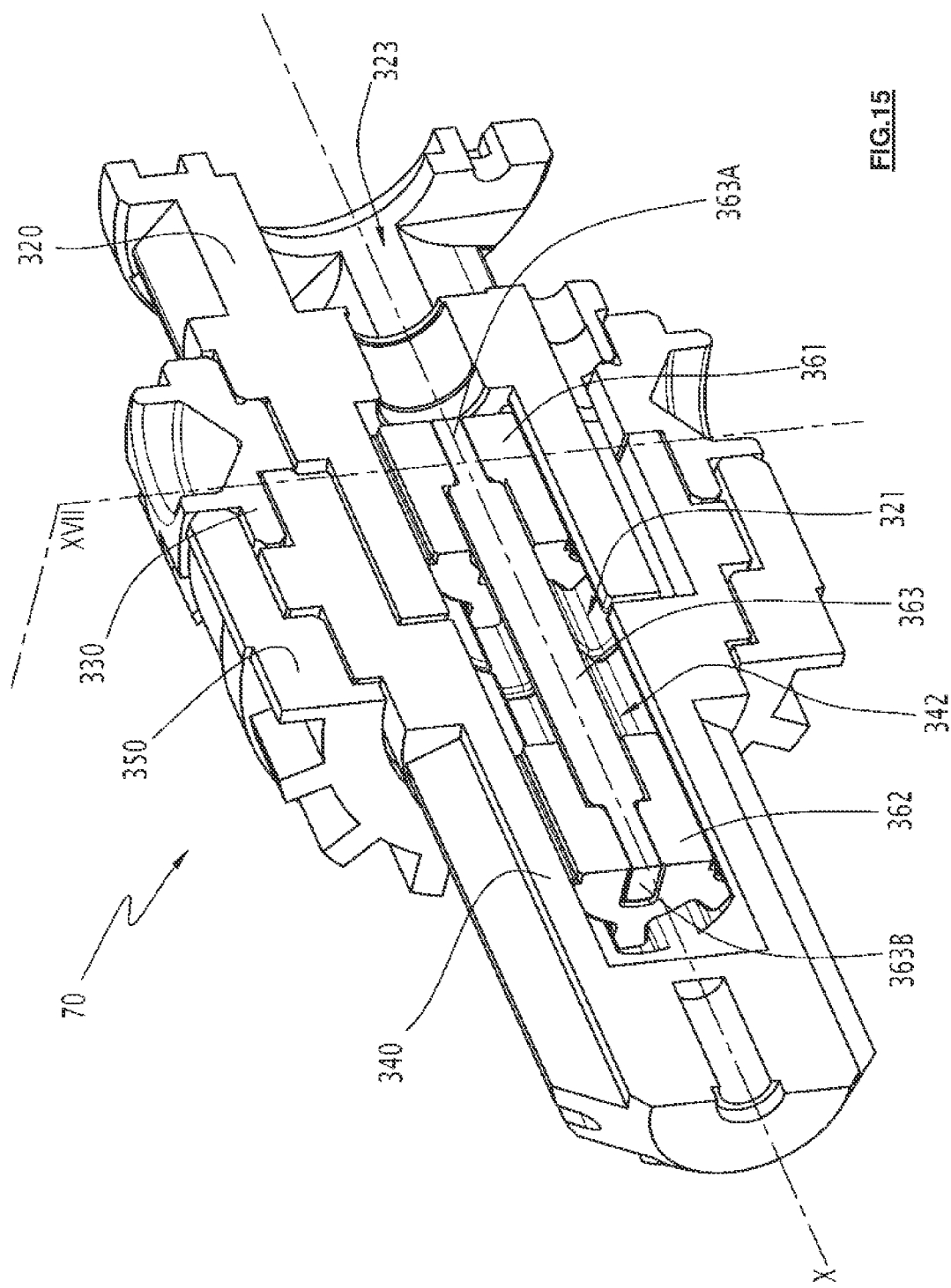
FIG. 15 is a schematic longitudinal perspective cross-section of the accessory in FIG. 14, along a sectional plane passing through the axis of rotation of the output shaft of the electromechanical actuator.

Alternatively, as shown in FIG. 13, the deformation element 70 comprises a torsion bar mounted between the gearbox output 19 and the output shaft 20. This deformation element 70 in the form of a torsion bar transmits the driving torque to the winding shaft 4 in the same way as the deformation element described above which comprises a spring. As shown in FIG. 13, the output shaft 20 comprises two separate parts. An upstream part 220 of the output shaft 20 is rotationally fixed with the output of the gearbox 19, by form-fitting cooperation between a splined internal recess 223 and the output shaft of the gearbox 19. A downstream part 240 is adapted for attachment to the winding shaft 4, for example by means of a connecting accessory, such as the one shown in FIG. 3 with reference 30. Both the upstream 220 and downstream 240 parts operate in a similar manner to the previous embodiment, in that they are held in position relative to each other by a resilient device 260, which in this case is constructed as a torsion bar. Both the upstream 220 and downstream 240 parts comprise abutment surfaces 231, 232 (not visible in FIG. 13) and 251, 252 which face each other when the output shaft 20 is assembled, with a gap remaining between the facing abutment surfaces. In other words, the angle formed by the surfaces 231 and 232 between them and/or the angle formed by the surfaces 251 and 252 between them is strictly less than 180°. The torsion bar 260 is held rotationally fixed at its ends with the upstream part 220 and with the downstream part 240, in particular by means of a form fit. In particular, the torsion bar 260 comprises a central part 263, which is generally cylindrical, and both the upstream 261 and downstream 262 ends which are polygonal, square or hexagonal in shape for example. A first fixing plate 280 comprises a central recess 282 complementary to the upstream end 261 of the torsion bar 260 and an outer periphery 284 complementary to the splined inner recess 223 of the upstream part 220. A second fixing plate 290 comprises a central recess 292 complementary to the downstream end 262 of the torsion bar 260 and an outer periphery 294 complementary to a non-circular inner recess 247 of the downstream part 240. The polygonal ends 261 and 262 of the torsion bar 260 are non-rotatably mounted in the fixing plates 280 and 290, which are themselves non-rotatably mounted in the upstream 220 and downstream 240 parts. The torsion bar 260 is also secured axially by screws 270, aimed at the ends 261 and 262 of the torsion bar and clamping the fixing plates 280 and 290 against the cylindrical central part 263 of the torsion bar 260.

According to another alternative shown in FIGS. 14 to 17, the deformation element 70 comprises a resilient device here also in the form of a torsion bar 360 mounted between the output of the gearbox 19 and the output shaft 20. This deformation element 70 transmits the driving torque to the winding shaft 4 in the same way as the deformation element in FIG. 13. An upstream part 320 of the output shaft 20 is rotationally fixed with the output of the gearbox 19, by form-fitting cooperation between a splined internal recess 323 of that upstream part and the output shaft of the gearbox 19. A downstream part 340 of the output shaft 20 is adapted for attachment to the winding shaft 4, for example by means of a connecting accessory, such as the one shown in FIG. 3 with reference 30. Two rings 330 and 350 are mounted around the upstream 320 and downstream 340 respectively. These rings are connected to each other by resilient clipping and/or form-fitting cooperation between tabs, only one of which is visible in FIG. 14 with reference 353, which extend from ring 350 and overlie external reliefs 332 of ring 330 when the rings are assembled together. The rings 330 and 350 allow the deformation element 70 to be held and centred in the defined housing or winding tube as in the first embodiment.

Figure 17:
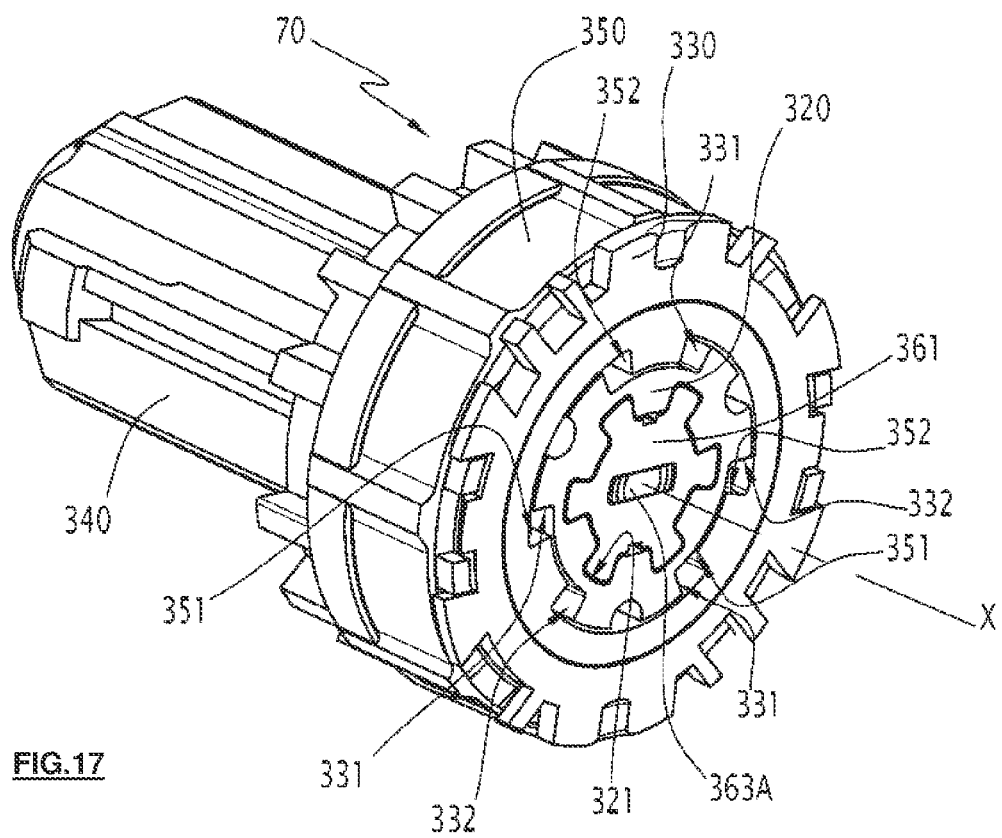
FIG. 17 is a perspective cross-section in the XVII plane in FIG. 15, with the understanding that the accessory is not cut longitudinally in this figure.

Both the upstream 320 and downstream 340 parts comprise abutment surfaces 331, 332 and 351, 352 respectively, which face each other when the output shaft 20 is assembled, as shown in FIG. 17, with gaps remaining between the facing abutment surfaces. The widths of these spaces, measured between the abutment surfaces 331 and 351 or 332 and 352 in a direction ortho-radial to the axis X defined as in the first embodiment, are variable as a function of the relative angular position of the upstream 320 and downstream 340 parts about the axis X.

The torsion bar 360 is generally dumbbell-shaped and comprises a central rod 363, preferably metal, and two pinion gears 361 and 362, made of synthetic material or metal, which form the upstream and downstream ends of the torsion bar respectively. The pinion gears 361 and 362 are respectively configured to mesh with an internal gear 321 of the upstream part 320 and with an internal gear 342 of the downstream part 340. Thus, the bar 360 works in torsion in the event of relative displacement of the upstream and downstream parts 320 and 340, in rotation about the X axis.

Figure 16:
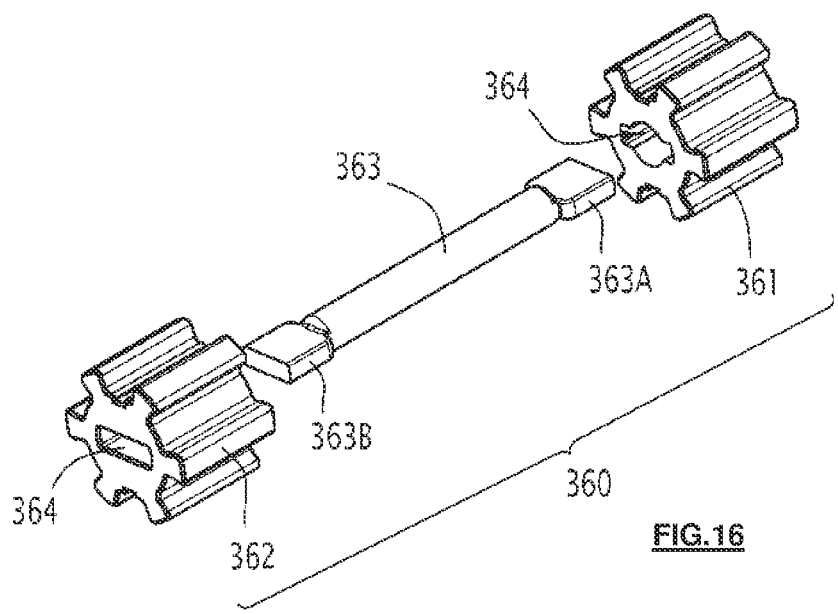
FIG. 16 is a larger-scale perspective view of a deformable element of the accessory of FIGS. 14 and 15.

As can be seen from FIG. 16, the centre rod has two flattened ends 363A and 363B configured to be received in correspondingly-shaped recesses 364 in the centre of the gears 361 and 362, thereby enabling torque transmission between the centre rod and the gears. The connection between the gears 361 and 362 on the one hand and the rod 363 on the other is reversible. The ends 363A and 363B have the same shape. The housing 364 of the two gears 361 and 362 also have the same shape.

By selecting the material or changing the diameter of the rod 363, it is possible to adjust the torsional stiffness of the bar 360, and thus that of the deformation element 70 as a whole. This is advantageous for building up a range of deformation elements 70 with different torsional stiffnesses.

The method may optionally comprise a preliminary learning step E100.

The learning step E100 may comprise a step of learning an angular variation threshold. Alternatively, the angular variation threshold between the two detection devices can be chosen to be fixed. The learning step may comprise a step of learning a detection time. The learning step E100 allows the obstacle detection to be adapted to the system 100, or even to the position of the screen 2 on its stroke.

This learning step E100 can take place when the motorised blackout device is installed in the system 100. In this case, the threshold(s) and/or the obstacle detection time can be determined by learning during the execution of a learning cycle, i.e. a complete opening-closing cycle without obstacles. During this cycle, one or more maximum deviations, i.e. local maximums of the angular deformation value DA of the kinematic chain during the cycle, are determined and recorded, the angular deformation being defined in a step similar to step E107.

At the same time, during this learning cycle, the duration of these angular deformation deviations is also measured. These deviation and duration values are used to define one or more threshold angular deformation values VS.

This threshold value or values are incorporated into the algorithms for filtering and analysing the values of position detection devices.

In other words, it may be possible to observe during the learning cycle of step E100 a progressive angular variation over at least part of the cycle, in which case the threshold may also be defined as a progressive variable threshold, with a relatively slow reaction time. Alternatively, during the learning cycle, sudden angular variations may be observed, for example due to the passage of hard points of the weighted bar 8 in the slides 6, with a relatively fast reaction time. The threshold values can be defined on the basis of values measured in training cycles and a safety margin value.

By applying an adjustment to the threshold values used for the recognition of an obstacle situation, unwanted triggers are avoided and the smooth running of the screen is adapted to the system situation. The sensitivity and reaction time of the device can thus be adapted to the specific situation of each system.

The learning step E100 can also be repeated during the life of the product, particularly automatically. Several learning cycles may be required before previously stored values are changed. In particular, the threshold values, detection sensitivity or detection time can be adjusted during these learning cycles to determine the most suitable value for the system.

The comparison signal 59 obtained from the two position detection devices 36 and 38 can be processed and filtered by conventional methods, including static or dynamic filtering. In particular, several filtering parameters can be defined and adjusted: the number F of filter values, the index deviation p from the previous value, the detection threshold S in counter value. The comparison signal 59 can be filtered according to a simple average, for example, or according to other more complex filterings on F values. An algorithm with extensive filtering, or dynamic filtering, eliminates high and low frequencies and allows a relative deviation measure to be determined.

A difference between a signal value at a time n, Dn, and the one already calculated at p previous values, Dp, is determined, i.e.: Dn−Dp=Diff. The detection threshold S is then used to trigger the function as soon as |Diff|>S. Positive or negative Diff values that do not correspond to the direction of travel (up or down) can also be eliminated to improve this principle. For a simple averaging filter, F=p. A range of values for F is then defined to filter more or less severely, which impacts the detection time and corresponds to more or less sensitivity to the risk of unwanted triggers.

If it is desired to limit the computational resources during the operation of the system, the filtering can be more limited. This is called static filtering. For example, the deviation measure can be determined as an absolute value.

In this case, for example, the trigger time, in particular the duration T or the number of samples, is measured, for which the value Dn of the comparison signal 59 at a time n is greater than the threshold S. The obstacle detection is triggered after a predefined trigger time.

Although the invention has been described in connection with particular embodiments, it is clear that it is by no means limited thereto and that it includes all technical equivalents of the described steps of the method and described means as well as combinations thereof.

The mentioned embodiments and variants can be combined to generate new embodiments of the invention.

The invention claimed is:

1. A method for detecting an obstacle opposing the movement of a screen in a home automation system for closure or sun protection comprising an electromechanical actuator for driving the movement of the screen, the electromechanical actuator comprising a torque support, a housing, an output shaft, an electric motor comprising a stator and a rotor, the system comprising a winding shaft rotating the screen and a connecting accessory between the output shaft of the electromechanical actuator and the winding shaft, the method comprising the following steps:
   a first step of determining a first angular displacement value, of the rotor with respect to the stator of the electromechanical actuator,
   a second step of determining a second angular displacement value, of the winding shaft relative to the housing or torque support of the electromechanical actuator,
   a third step of converting
      (a) the first angular displacement value of the rotor into an equivalent angular displacement data of the winding shaft or
      (b) the second angular displacement value of the winding shaft relative to the housing or torque support of the electromechanical actuator into an equivalent angular displacement data of the rotor,
   a fourth step of determining an angular deformation of a kinematic chain between the electric motor and the winding shaft by comparing the first angular displacement value determined in the first step to the second angular displacement value determined in the second step,
   a fifth step of assessing that an obstacle to the movement of the screen is present if the angular deformation of the kinematic chain determined in the fourth step is greater than a predefined angular deformation threshold value.

2. The method according to claim 1, wherein the equivalent angular displacement data of the winding shaft is obtained by dividing the first angular displacement value of the rotor by the theoretical reduction ratio of a gearbox of the electromechanical actuator, the reduction ratio being a number greater than 1, and the equivalent angular displacement data of the rotor is obtained by multiplying the second angular displacement value of the winding shaft by the theoretical reduction ratio of the gearbox of the electromechanical actuator.

3. The method according to claim 2, further comprising a step of using a learning cycle to determine the predefined angular deformation threshold value as a function of at least one of i) data of angular deformation deviations and ii) triggering time of the angular deformation deviations measured during the learning cycle.

4. The method according to claim 2, wherein the screen has a path with extreme positions, and reaching of the extreme positions by the screen is controlled by comparing the angular displacement value of the winding shaft with a predefined displacement value.

5. The method according to claim 1, further comprising a step of processing and filtering a comparison signal obtained from an angular displacement signal of the rotor and an angular displacement signal of the winding shaft.

6. The method according to claim 5, further comprising a step of using a learning cycle to determine the predefined angular deformation threshold value as a function of at least one of i) data of angular deformation deviations and ii) triggering time of the angular deformation deviations measured during the learning cycle.

7. The method according to claim 1, further comprising a step of using a learning cycle to determine the predefined angular deformation threshold value as a function of at least one of i) data of angular deformation deviations and ii) triggering time of the angular deformation deviations measured during the learning cycle.

8. The method according to claim 1, wherein the screen has a path with extreme positions, and reaching of the extreme positions by the screen is controlled by comparing the second angular displacement value of the winding shaft with a predefined displacement value.

9. An electromechanical actuator comprising a torque support, a housing, an electric motor comprising a stator and a rotor, and an output shaft, rotatably engaged with a winding shaft through a connecting accessory, the electromechanical actuator further comprising
 a first position detection device, adapted to define an angular position of the rotor and
 a second position detection device, adapted to define an angular position of the winding shaft in rotational engagement with the output shaft, and an electronic control unit configured to implement the method of claim 1 by processing the data from the two position detection devices,
 a deformation element placed on the kinematic chain between the electric motor and the winding shaft, comprising an upstream part and a downstream part, rotatable relative to each other and comprising a resilient device opposing the rotational movement of the upstream and downstream parts.

10. The electromechanical actuator according to claim 9, wherein the winding shaft is a winding tube in which the electromechanical actuator is at least partially inserted, the electromechanical actuator comprising a bearing ring rotating around the housing with respect to the torque support and in rotational engagement with the winding tube, the second position detection device being adapted to determine the rotation of the bearing ring with respect to the torque support of the electromechanical actuator.

11. The electromechanical actuator according to claim 10, wherein the bearing ring comprises at least two magnetic sectors distributed uniformly over a circumference or a surface opposite a magnetic sensor device arranged in the housing of the electromagnetic actuator.

12. The electromechanical actuator according to claim 9, wherein the resilient device comprises a torsion bar.

13. The electromechanical actuator according to claim 12, wherein the resilient device comprises a central rod and two pinion gears attached to ends of the central rod and meshing with internal teeth of the upstream and downstream parts.

14. The electromechanical actuator according to claim 9, wherein the electric motor includes an electronically commutated permanent magnet synchronous electric motor.

15. The electromechanical actuator according to claim 9, wherein only the second detection device of the two detection devices comprises a physical sensor device for determining the angular position.

16. The electromechanical actuator according to claim 15, wherein the physical sensor device includes magnetic sensors.

17. A closure or sun protection system comprising a screen, a winding shaft and an electromechanical actuator in rotational engagement with the winding shaft, the electromechanical actuator being in accordance with claim 9.

18. A method for detecting an obstacle opposing the movement of a screen in a home automation system for closure or sun protection comprising an electromechanical actuator for driving the movement of the screen, the electromechanical actuator comprising a torque support, a housing, an output shaft, an electric motor comprising a stator and a rotor, the system comprising a winding shaft rotating the screen and a connecting accessory between the output shaft of the electromechanical actuator and the winding shaft, the method comprising the following steps:
 a preliminary step of learning a predefined deformation threshold value as a function of data of angular deformation deviations and/or of triggering time of these deviations measured during a learning cycle,
 a first step of determining a first angular displacement value, of the rotor with respect to the stator of the electromechanical actuator,
 a second step of determining a second angular displacement value, of the winding shaft relative to the housing or torque support of the electromechanical actuator,
 a third step of determining an angular deformation of a kinematic chain between the electric motor and the winding shaft by comparing the first angular displacement value determined in the first step to the second angular displacement value determined in the second step,
 a fourth step of assessing that an obstacle to the movement of the screen is present if the angular deformation of the kinematic chain determined in the third step is greater than the predefined angular deformation threshold value.

19. The method according to claim 18, wherein the screen has a path with extreme positions, and reaching of the extreme positions by the screen is controlled by comparing the second angular displacement value of the winding shaft with a predefined displacement value.

* * * * *